United States Patent [19]
Neumann

[11] Patent Number: 5,422,792
[45] Date of Patent: Jun. 6, 1995

[54] ILLUMINATION DEVICE FOR VEHICLES

[75] Inventor: Rainer Neumann, Stuttgart, Germany

[73] Assignee: Robert Bosch GmbH, Stuttgart, Germany

[21] Appl. No.: 215,369

[22] Filed: Mar. 21, 1994

[30] Foreign Application Priority Data

Apr. 28, 1993 [DE] Germany .................. 43 13 915.9

[51] Int. Cl.$^6$ .............................................. F21V 7/04
[52] U.S. Cl. ........................................ 362/32; 362/61; 362/324; 362/284; 385/16; 385/19; 385/901
[58] Field of Search .................. 362/32, 284, 283, 61, 362/80, 324, 322, 319, 277, 321; 385/19, 20, 21, 22, 23, 16, 901

[56] References Cited

U.S. PATENT DOCUMENTS

| | | | |
|---|---|---|---|
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 5,147,128 | 9/1992 | Windross | 362/32 |
| 5,184,883 | 2/1993 | Finch et al. | 362/61 X |
| 5,222,793 | 6/1993 | Davenport et al. | 362/32 |
| 5,311,410 | 5/1994 | Hsu et al. | 362/32 X |

FOREIGN PATENT DOCUMENTS 0426337  8/1991  European Pat. Off. .

Primary Examiner—Ira S. Lazarus
Assistant Examiner—Thomas M. Sember
Attorney, Agent, or Firm—Michael J. Striker

[57]  ABSTRACT

An illumination device for a vehicle comprises at least one light generator with a light source, a plurality of light conductors receiving light from the light source, a plurality of light distributing units connected with the light conductors and operating for different illuminating functions, and a screening device associated with at least one of the light distributing units and switchable between a passive position in which the screening device permits supplying light in the light conductor associated with the one light distributing unit to the light distributing unit or permits exiting of light from the light conductor associated with the one light distributing unit, and an active position in which the screening device screens light of the light conductor associated with the one light distributing unit from entering the one light distributing unit or exiting the one light distributing unit. The screening device in the active position is reflective and deflects light exiting the associated light conductor and impinging on it for supplying in a light distributing unit serving for another illumination function.

10 Claims, 3 Drawing Sheets

ILLUMINATION DEVICE FOR VEHICLES

BACKGROUND OF THE INVENTION

The present invention relates generally to an illumination device for vehicles.

More particularly, it relates to an illumination device for a vehicle which has at least one light generator with a light source and light conductors receiving the light and connected with light distributing units performing different illumination functions.

Illumination devices of the above mentioned general type are known in the art. One of such illumination device is disclosed for example in the European patent document EP 0 426 337 A2. This illumination device has a light generator with a light source and a plurality of light conductors connected with light distributing units for different illumination functions. A screening device is associated with each of the light distributing units and formed as a displaceable screen. In a passive position the screening device is arranged so that the light exiting from the light conductor associated with the respective light distributing unit can exit also from the light distributing unit. In an active position the screening device is arranged in a beam path of the light exiting from the light conductor associated with the respective light distributing unit and screens at least partially the light exiting from it, so that it cannot exit from the light distributing unit. A simultaneous use of all illumination functions is in practice required only seldom, so that the screening device is activated only at a part of the light distributing units. The light screened by the screening device remains therefore non-used, so that the light quantity available from the light generator in view of the seldom simultaneously used joint illumination functions is insignificantly great and therefore for the light generator a light source of high power is required.

SUMMARY OF THE INVENTION

Accordingly, it is an object of the present invention to provide an illumination device for a vehicle of the above mentioned type, which avoids the disadvantages of the prior art.

In keeping with these objects and with others which will become apparent hereinafter, one feature of the present invention resides, briefly stated, in an illumination device in which the screening device in its active position is reflecting and deviates the light exiting the associated light conductor and impinging on it for a supply in a light distributing unit operating for another illuminating function.

When the illumination device is designed in accordance with the present invention, it has the advantage that due to the deflection of the light screened by the screening device for supplying in a light distributing unit operating for another illumination function, the light quantity available from the light generator is lower and for it a light source of lower power is sufficient.

In accordance with another feature of the present invention, the screening device is arranged in the beam path of the light exiting from the associated light conductor, is light permeable in its passive position, and is light impermeable and reflective in its active position. In this construction the screening device can be stationary and does not require any displacing device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
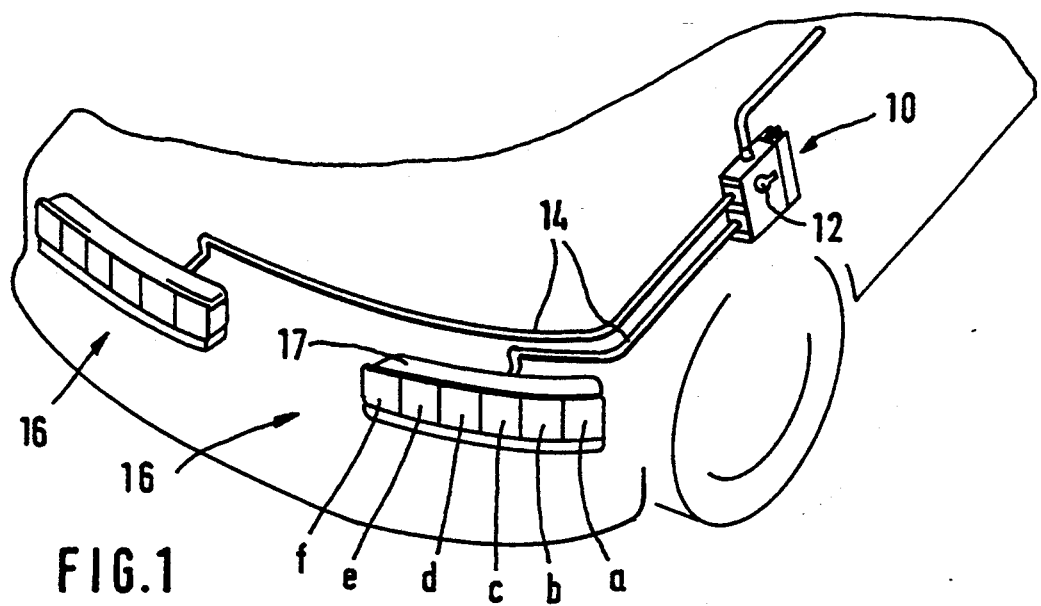
FIG. 1 is a front view of a vehicle with an illumination device in accordance with the present invention.

A vehicle shown in a front view of FIG. 1 is a motor vehicle having an illumination device in accordance with the present invention. The illumination device includes a center light generator 10 with a light source 12. A light source 12 can be formed for example as a gas discharge lamp or an incandescent lamp. Several light conductors 14 extend from the light generator 10 to light distributing units 16 arranged at the front side of the vehicle. The light generator 10 is formed so that in it the light sent from the light source 12 is coupled in the light conductor 14 with a maximum high efficiency. The light generator can for example be formed as in the DE-40 40 020 A1 which contents is incorporated here as a reference. Also, several light generators 10 can be provided. The light conductors 14 can be formed each from a plurality of individual light conducting fibers or cables. In the shown embodiments from the light generator 10 two bundles of light conductors 14 extend and are branched at the light distributing units 14.

Several light distributing units 16a-f are arranged at both sides of the vehicle and serve for different illumination functions. The light distributor unit 16a-16f can be arranged in a joint housing 17 and covered with a joint transparent cover disc 19. In the shown embodiments the three light distributing units 16a, 16b, 16c, arranged at the outer side of the vehicle are used for producing a low beam, the light distributing units 16d, 16e arranged on them at the vehicle center serve for producing a high beam, and the light distributing unit 16f arranged at the vehicle center serves for producing a fog beam. Also, other light distributing units 16 can be provided when needed and perform different illumination functions, for example an intensive illumination of the remote region which is favorable for high traveling speeds or an intense illumination of the region near the vehicle which is favorable for poor visibility conditions. Each light distributing 16a–16f is associated with a light conductor 14. Light coming from the light generator 10 and extending from them passes through one or several lenses 18 and is thereby influenced for producing the low beam, high beam, or fog beam bundle.

The illuminating functions high beam and fog beam are only seldom activated from the experience in the practice relative to the illumination function of the low beam. For providing a separate activation of the different illuminating functions, the light distributing units 16d, 16e for the high beam and/or the light distributing units 16f for fog beam are associated with a screening device, which can hinder a light exit from this light distributing units for turning off these illumination functions.

Figure 2:
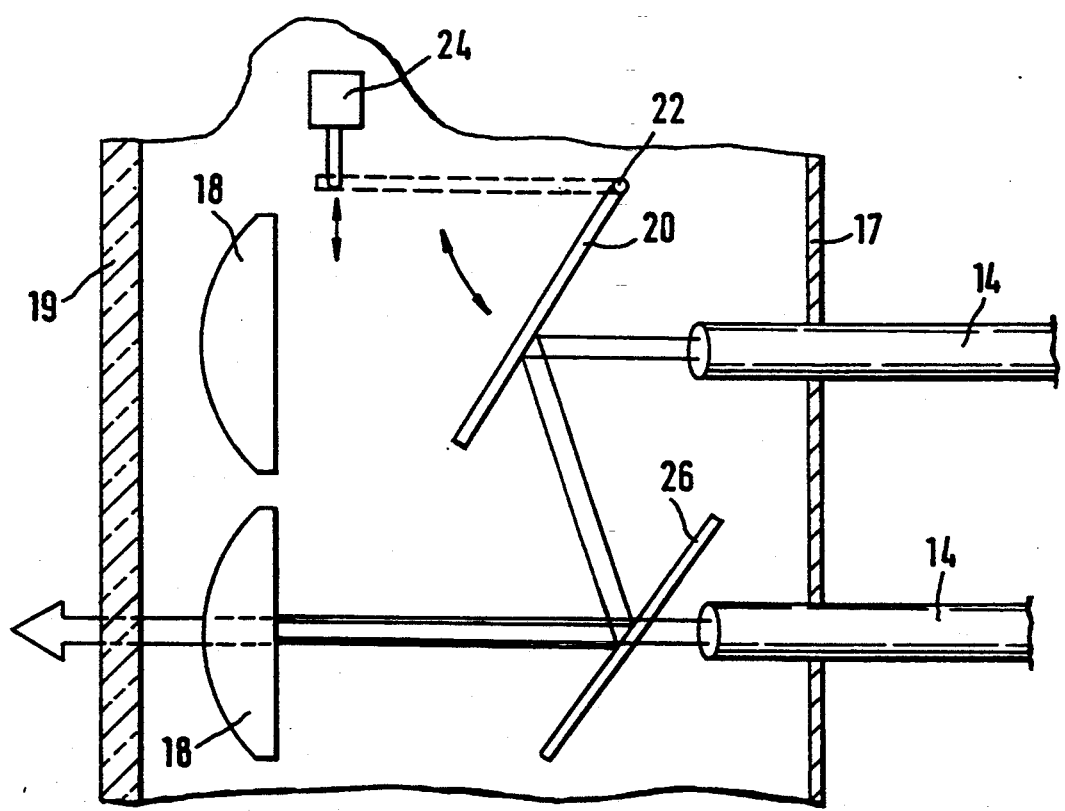
FIG. 2 is a horizontal longitudinal section through the illumination device of the vehicle of FIG. 1 in accordance with the first embodiment.

In the embodiment shown in FIG. 2 the screening device is formed as a movable reflection element 20. In a first position the reflection element 20 is arranged so that the light exiting the light conductor 14 associated with the respective light distributing unit 16 is supplied without hindrance to a lens 18 and can exit from the light distributing unit 16. This position of the reflection element 20 can be identified as its passive position. The reflection element 20 is movable to a second position in which it is arranged in a beam path of the light exiting the respective light conductor 14, so that it screens this light and no light or approximately no light can exit from this light distributing unit 16. This second position of the reflection element 20 can be identified as an active position. In this embodiment, the reflection element 20 can be turnable about an axis 22. However, it is also possible that the reflection element 20 is linearly movable between these two positions. The movement of the reflection element 20 is performed by a schematically shown displacing device 24 which can operate electrically or mechanically. The displacing device 24 is connected with a light switch of the vehicle, so that it automatically moves the reflection element 20 to the proper position. In its active position the light exiting from the respective light conductor 14 is reflected by the reflection element 20.

In a first embodiment variant shown in FIG. 2 the light is directed by the reflection element 20 to a further reflection element 26, by which the light is supplied in a light distributing element 16 which serves another illumination function. In this embodiment the light screened by the reflection element 20 is supplied to the light distributing unit 16a, 16b or 16c which serves the illumination function low beam, and the light distributing unit 16c which is located the closest to the light distributing unit 16d is suitable for this purpose the best. The further reflection element 26 is arranged preferably outside the beam path of the light exiting the light conductor associated with the light distributing unit for the low beam, and thereby does not hinder the light passage to the respective lens 18 and the light exit from the light distributing unit. Alternatively, further reflection element 26 can be formed so that it is permeable for the light which exits from the light conductor associated with the light distributing unit serving for the low beam while it reflects the light deviated from the reflection element 20. For this purpose a known one-side transparent mirror can be utilized. The light supplied by the reflection elements 20, 26 in the light distributing unit 16c passes, similarly to the light exiting the light conductor 14 associated with this light distributing unit 16c, also through the lens 18 and is influenced by it for forming the low beam bundle.

Figure 3:
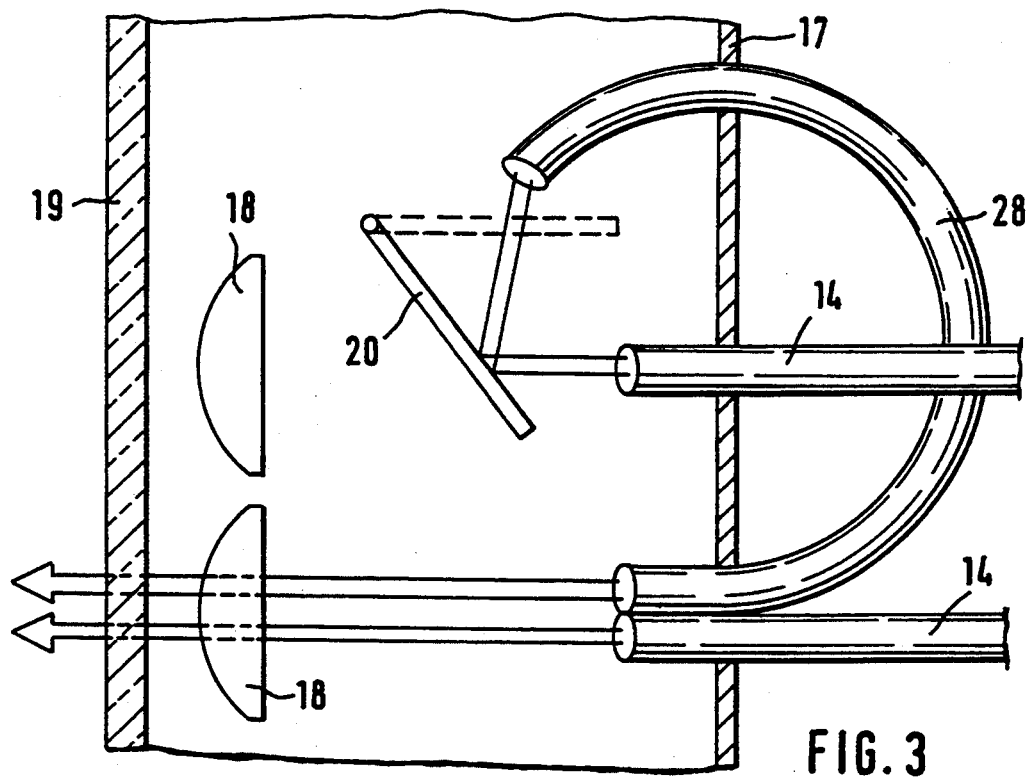
FIG. 3 is a view showing a variant of the illumination device of FIG. 2.

In the second variant shown in FIG. 3 the light is coupled by the reflection element 20 in a further light conductor 28 which leads to the light distributing unit operating for another illumination function. The light can be supplied further by further light conductor 20 over greater distances than in the embodiment in accordance with the preceding variant with the further reflection element 26. The reflection surface of the reflection element 20 is formed so that it concentrates light which impinges on it on the light inlet surface of the further light conductor 28.

Figure 4:
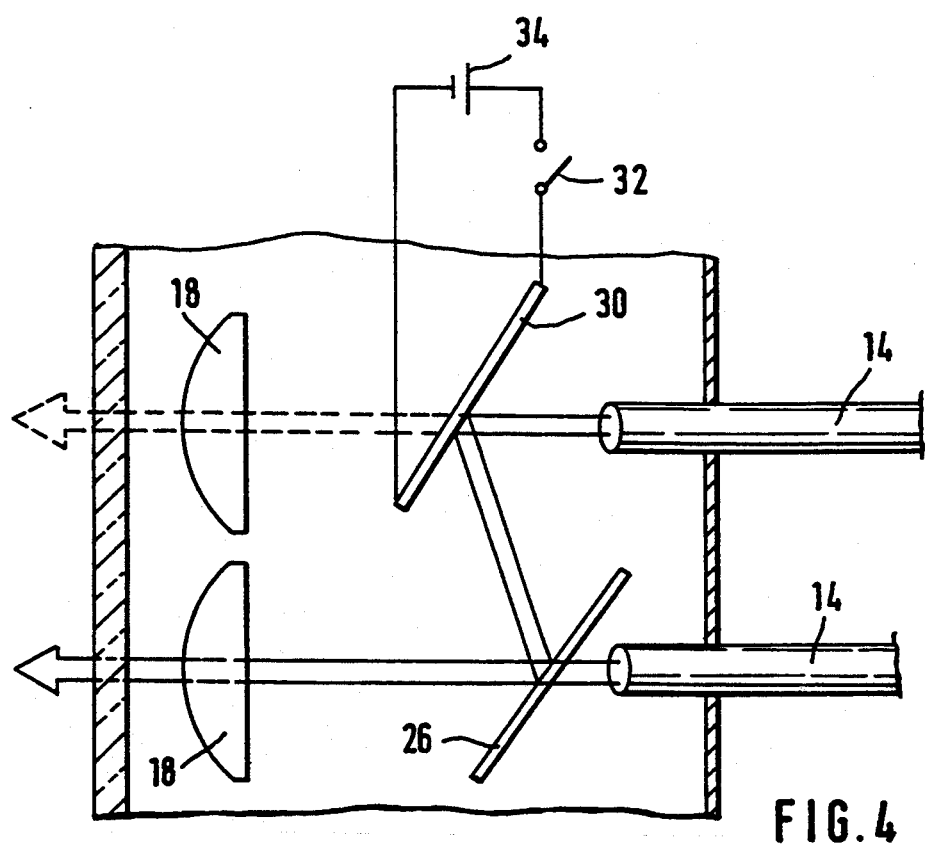
FIG. 4 is a view showing a horizontal longitudinal section through the illumination device of a second embodiment of the invention.

A second embodiment is shown in FIG. 4, in which the screening device associated with the light distributing unit 16 is formed as a stationary screen 30. The screen 30 is composed of a material or coated with a material which is switchable between a condition in which it is light permeable and a condition in which it reflects the light impinging on it. Such materials are known as electrochromous materials, in which the switching between both positions is performed under the action of an electrical voltage. The screen 30 in this embodiment is connectable by a switch 32 with a voltage source 34, and the actuation of the switch 32 is performed by the light of the vehicle. Advantageously, in this embodiment the screening device is formed as a screen 30 with changeable light permeability which does not require any movable parts. Through the screen 30 the light can be supplied either through a further reflection element 26 as in the variant of FIG. 3, or through a further light conductor 28 as shown in the variant of FIG. 3 to a light conducting 16 which serves for another illuminating function.

Figure 5:
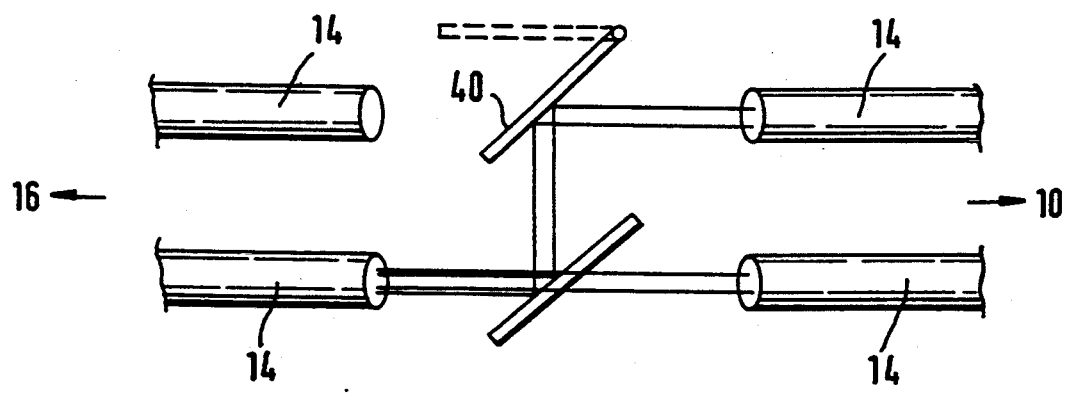
FIG. 5 is a view showing a third embodiment of the illumination device.

In deviation from the above described embodiments, the screening device in all embodiments can be arranged in the region between the light generator 10 and the light distributing unit 16, as shown for the third embodiment in FIG. 5. The light conductor 14 is interrupted at a predetermined location, and the screening device is associated on this location with the light conductor 14 so as to supply the light to the light distributing unit 16. In this construction a light exit must be alternatingly possible or prevented, such as for the light distributing units 16d, 16e or 16f for the high beam or fog beam. Advantageously, in this arrangement of the screening device the light must not be deviated over great distances since the light conductors 14 can be arranged closely to one another.

It will be understood that each of the elements described above, or two or more together, may also find a useful application in other types of constructions differing from the types described above.

While the invention has been illustrated and described as embodied in an illumination device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An illumination device for a vehicle, comprising at least one light generator with a light source; a plurality of light conductors receiving light from said light source; a plurality of light distributing units connected with said light conductors and operating for different illuminating functions; and a screening device associated with at least one of said light distributing units and switchable between a passive position in which light in a light conductor associated with said one light distributing unit operating for one illuminating function enters or exits said one light distributing unit operating for one illuminating function, and an active position in which said screening device screens light of the light conductor associated with said one light distributing unit operating for one illuminating function so that light of the light conductor association with said one light distributing unit operating for one illuminating function cannot enter said one light distributing unit or exit said one light distributing unit operating for one illuminating function, said screening device in said active position being reflective and deflecting light exiting the light conductor associated with said one light distributing unit and impinging on the screening device for supplying light in a light distributing unit operating for another illuminating function.

2. An illumination device as defined in claim 1; and further comprising a reflecting element arranged so that said screening device in said active position deviates light exiting from the associated light conductor and impinging on the screening device to said further reflection element from which the light is supplied to said light distributing unit serving for another illumination function.

3. An illumination device as defined in claim 1; and further comprising a further light conductor arranged so that said screening device in its active position couples light exiting from the associated light conductor and impinging on the screening said further light conductor which is connected with the light distributing unit serving for another illuminating function.

4. An illumination device as defined in claim 1, wherein said screening device is arranged near said light distributing units.

5. An illumination device as defined in claim 1, wherein said screening device is arranged between said light generator and said distributing units.

6. An illumination device as defined in claim 1, wherein said screening device is formed as a moving reflection element which in said passive position is arranged outside a beam path of the light exiting the associated light conductor and in said active position is arranged in a beam path of the light exiting the associated light conductor.

7. An illumination device as defined in claim 1, wherein said screening device is arranged in a beam path of the light exiting the associated light conductor and in said passive position is light permeable while in said active position it is light impermeable and reflective.

8. An illumination device as defined in claim 7, wherein said screening device is formed as a stationary screen and is switchable between said passive position and said a active position under the action of an electric voltage.

9. An illumination device for a vehicle, comprising at least one light generator with a light source; a plurality of light conductors receiving light from said light source; a plurality of light distributing units connected with said light conductors and operating for different illuminating functions; and a screening device associated with at least one of said light distributing units and switchable between a passive position in which light in a light conductor associated with said one light distributing unit operating for one illuminating function enters or exits said one light distributing unit operating for one illuminating function, and an active position in which said screening device screens light of the light conductor associated with said one light distributing unit operating for one illuminating function so that light of the light conductor association with said one light distributing unit operating for one illuminating function cannot enter said one light distributing unit or exit said one light distributing unit operating for one illuminating function, said screening device in said active position being reflective and deflecting light exiting the light conductor associated with said one light distributing unit and impinging on the screening device for supplying light in a light distributing unit operating for another illuminating function, said light distributing unit with which said screening device being associated serves for an illumination function high-light, said screening device deflecting light for supplying in a light distributing unit serving for an illumination function low beam.

10. An illumination device for a vehicle, comprising at least one light generator with a light source; a plurality of light conductors receiving light from said light source; a plurality of light distributing units connected with said light conductors and operating for different illuminating functions; and a screening device associated with at least one of said light distributing units and switchable between a passive position in which light in a light conductor associated with said one light distributing unit operating for one illuminating function enters or exits said one light distributing unit operating for one illuminating function, and an active position in which said screening device screens light of the light conductor associated with said one light distributing unit operating for one illuminating function so that light of the light conductor association with said one light distributing unit operating for one illuminating function cannot enter said one light distributing unit or exit said one light distributing unit operating for one illuminating function, said screening device in said active position being reflective and deflecting light exiting the light conductor associated with said one light distributing unit and impinging on the screening for supplying light in a light distributing unit operating for another illuminating function, said light distributing unit with which said screening device being associated serves for an illumination function fog light, said screening device deflecting light for supplying in a light distributing unit serving for an illumination function low beam.

* * * * *